United States Patent [19]
van der Lely

[11] Patent Number: 4,791,996
[45] Date of Patent: Dec. 20, 1988

[54] AGRICULTURAL TRACTOR WITH LIGHTWEIGHT FRAME AND FRONT AND REAR WHEELS FORMING SUBSTANTIALLY CONTINUOUS WHEEL PATH

[76] Inventor: Cornelis van der Lely, 7 Brüschenrain, Zug, Switzerland

[21] Appl. No.: 611,040

[22] PCT Filed: Sep. 27, 1983

[86] PCT No.: PCT/NL83/00036
§ 371 Date: May 4, 1984
§ 102(e) Date: May 4, 1984

[87] PCT Pub. No.: WO84/01336
PCT Pub. Date: Apr. 12, 1984

[30] Foreign Application Priority Data
Sep. 27, 1982 [NL] Netherlands .................. 8203727

[51] Int. Cl.⁴ .............................. A01B 33/00
[52] U.S. Cl. ......................... 172/47; 172/116; 172/292; 180/22; 180/53.3; 180/53.7; 180/209; 180/900; 296/187
[58] Field of Search ........... 172/114, 116, 292, 47, 172/810; 180/24.03, 53.3, 53.4, 53.61, 53.62, 53.7, 22, 23, 24, 209, 9.26, 9.28, 9.34, 9.36, 900; 296/187, 190, 203, 204, 205

[56] References Cited

U.S. PATENT DOCUMENTS

| | | | |
|---|---|---|---|
| 2,645,987 | 7/1953 | Brooks | 172/116 X |
| 2,739,517 | 3/1956 | Roberts | 172/297 X |
| 2,798,566 | 7/1957 | Smith | 180/24.03 |
| 3,104,528 | 9/1963 | Hörig | 180/53.4 X |
| 3,249,027 | 5/1966 | Peterson | 180/22 X |
| 3,570,604 | 3/1971 | Allard et al. | 172/116 X |
| 3,672,459 | 6/1972 | Rankins | 180/13 |
| 3,695,374 | 10/1972 | Commons | 180/215 |
| 3,946,824 | 3/1976 | Jester et al. | 180/215 |
| 4,059,303 | 11/1977 | Mauri | 296/187 |
| 4,094,373 | 6/1978 | Crow, Jr. | 180/22 |
| 4,161,991 | 7/1979 | van der Lely | 180/53.7 |
| 4,206,825 | 6/1980 | van der Lely | 180/900 X |
| 4,291,946 | 9/1981 | van der Lely | 180/900 X |
| 4,350,222 | 9/1982 | Lutteke et al. | 180/209 |

FOREIGN PATENT DOCUMENTS

| | | | |
|---|---|---|---|
| 2950779 | 6/1981 | Fed. Rep. of Germany | 180/22 |
| 40072 | 4/1932 | France . | |
| 2299204 | 8/1976 | France . | |
| 2443367 | 7/1980 | France . | |
| 2457208 | 12/1980 | France . | |
| 636654 | 3/1962 | Italy | 180/9.28 |
| 1372886 | 11/1974 | United Kingdom . | |
| 1541903 | 3/1979 | United Kingdom . | |
| 1567183 | 5/1980 | United Kingdom . | |

OTHER PUBLICATIONS

"MF 2805 Tractor", *Massey Ferguson Machinery Guide*, 824 AG, pp. 12, 13.

*Primary Examiner*—Richard T. Stouffer
*Attorney, Agent, or Firm*—Penrose Lucas Albright; Robert A. Miller

[57] ABSTRACT

A tractor having a high power-to-weight ratio (power 100 kw, weight 3500 kg) is obtained by using lightweight components (e.g., made from synthetic resin) for the cab, and by making the wheels smaller than is usual, i.e., with a diameter of 1.3 meters, and from aluminum or other light-weight material. Tractor is improved by providing an implement or implements which, in operation, are driven form power take-off shafts and act to propel the tractor.

11 Claims, 7 Drawing Sheets

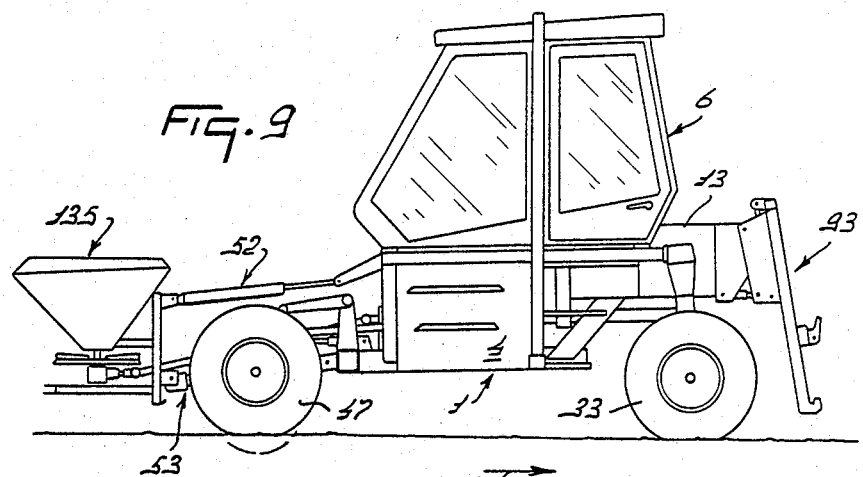
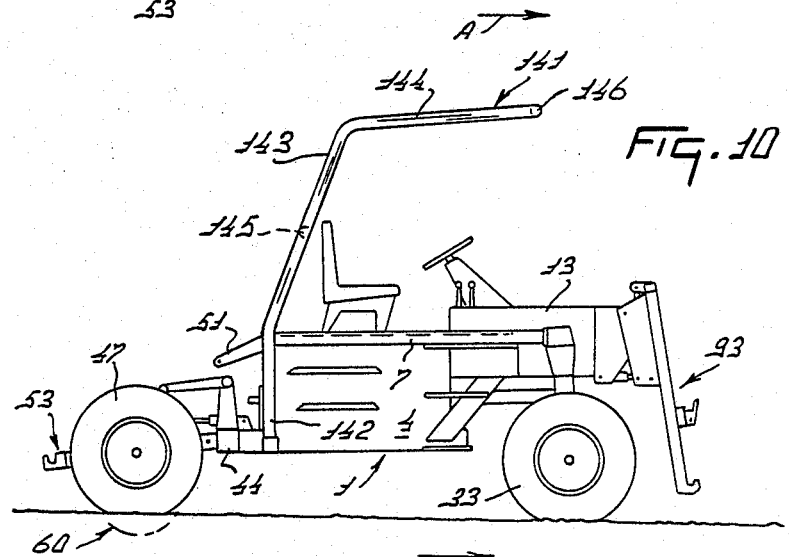
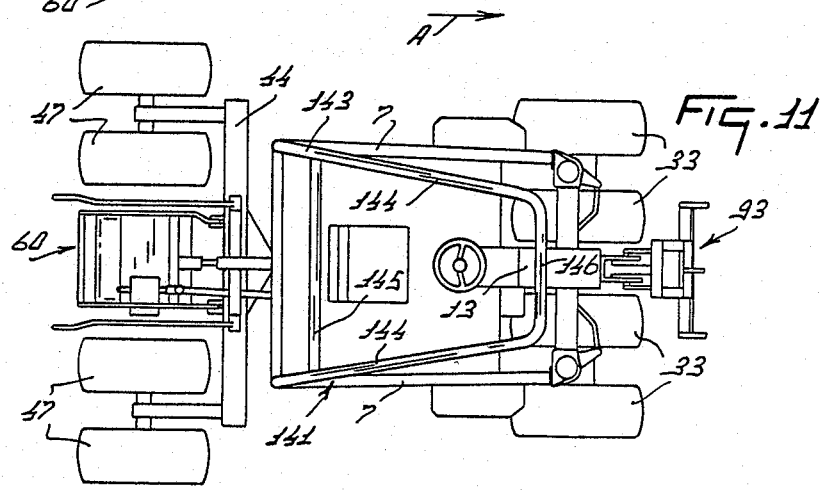

AGRICULTURAL TRACTOR WITH LIGHTWEIGHT FRAME AND FRONT AND REAR WHEELS FORMING SUBSTANTIALLY CONTINUOUS WHEEL PATH

BACKGROUND OF THE INVENTION

This invention relates to a tractor being a power unit for agricultural machines.

Known tractors are tending to become heavier and heavier so that not only the ground pressure increases are adversely affecting the ground structure, but also ever increasing driving power is required.

SUMMARY OF THE INVENTION

According to one aspect of the present invention there is provided a tractor being a power unit for agricultural machines comprising an engine and a plurality of wheels, said wheels being of such width, that the soil which receive such wheels compacted to a relatively minor degree over a large width, the tractor having a high power-to-weight ratio and being provided with at least one power take-off shaft to which power driven machines are connectable.

According to a second aspect of the present invention there is provided a tractor comprising rotary soil working means at the front of the tractor which in operation exerts a pulling force onto the tractor.

According to a third aspect of the present invention there is provided a cultivator having tines that are hydraulically adjustable in height with respect to the frame of the cultivator.

For a better understanding of the present invention and to show how it may be carried into effect, reference will now be made, by way of example, to the accompanying drawings, in which:

BRIEF DESCRIPTION OF THE DRAWINGS

FIG. 9 is a side view of the tractor with a different implement attached to it;
FIG. 10 is a side view of an alternative embodiment of a tractor provided with a safety framework;
and
FIG. 11 is a plan view of the tractor of FIG. 10.

DESCRIPTION OF THE PREFERRED EMBODIMENTS

Figure 1:
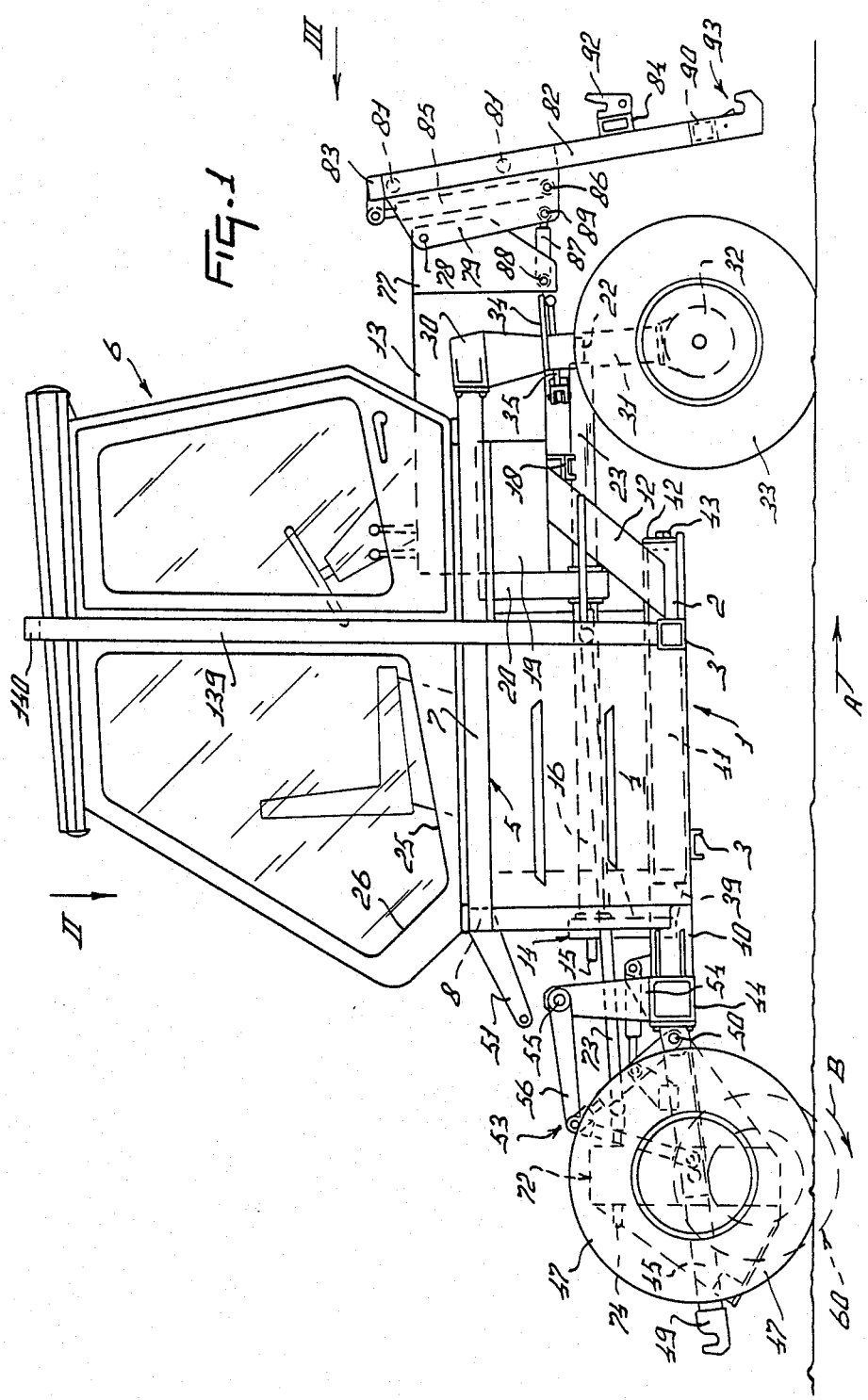
FIG. 1 is a side view of a tractor.
Figure 2:
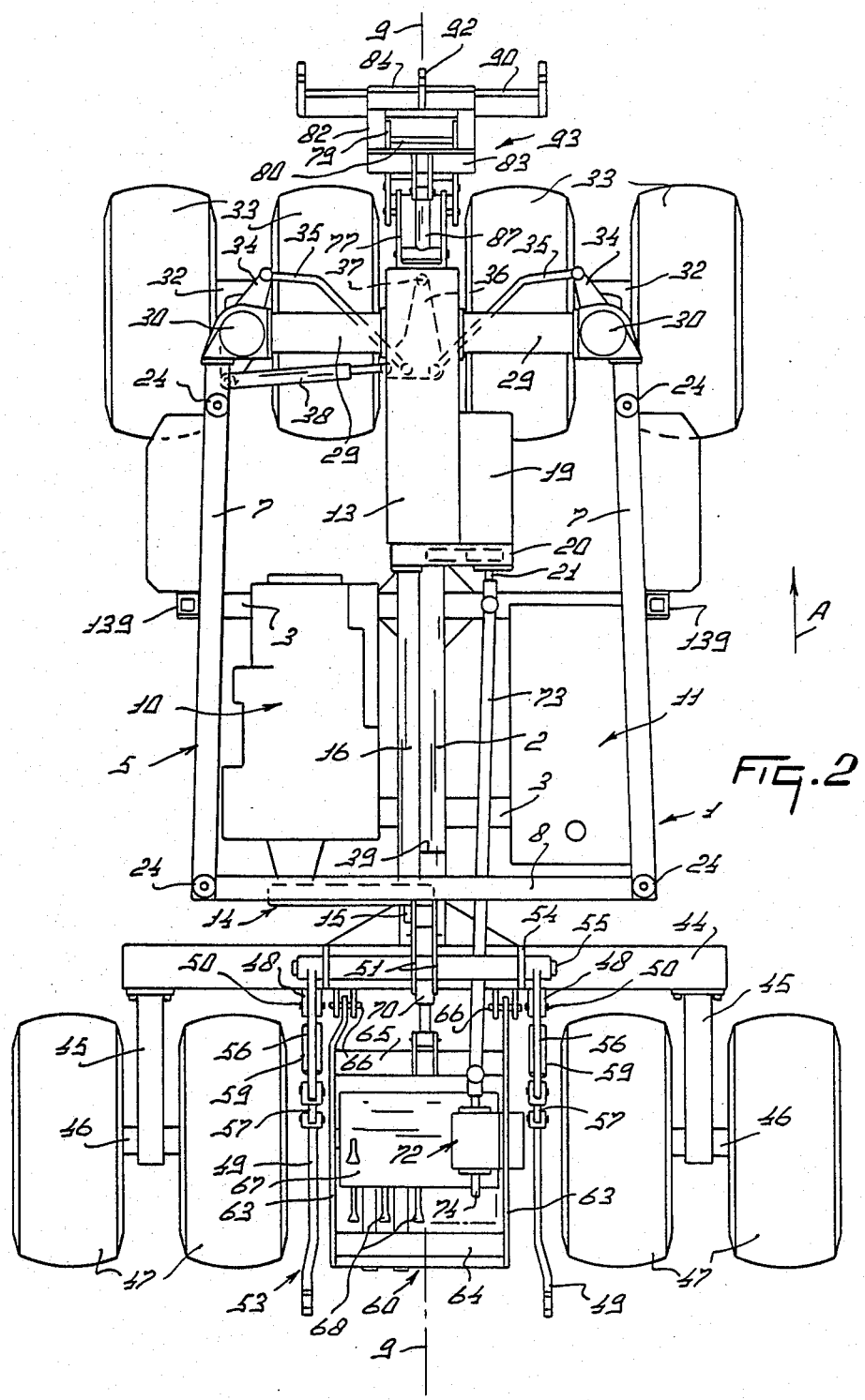
FIG. 2 is a plan view of the tractor of FIG. 1.

The tractor shown in the Figures has a frame 1 mainly comprising a horizontal, hollow tube 2 extending in the intended direction of operative travel of the tractor, as indicated by an arrow A. The tube 2 is situated at the bottom of the frame and is provided with two horizontal carriers 3 extending transversely of the direction A. The carriers 3 are spaced apart from each other and their outer ends are fastened to upright cover plates 4 which are directed in the direction A and, as viewed from the side (FIG. 1) are rectangular. The upper edges of the cover plates are secured to the lower edges of a U-shaped frame part 5, which is shown in plan in FIG. 2. The frame part 5 has a relatively lightweight tubular construction, since its main function is to support only a cab 6 (omitted in FIG. 2 for the sake of clarity). As shown in FIG. 2, the frame part 5 comprises two tubes 7 located one on each side of the tractor and interconnected at their rear ends by a tube 8 which extends horizontally and transversely of the direction A. The construction comprising the parts 1 to 8 is approximately symmetrical about the vertical, central, longitudinal plane of the tractor, which is designated in FIG. 2 by reference numeral 9. The center line of the main frame tube 2 is thus also located in the plane 9. FIG. 2 shows a driving engine 10 disposed to one side of the plane 9 and supported by the carriers 3. The engine 10 is a lightweight, air-cooled engine with a power of about one hundred kilowatts.

On the other side of the plane 9, there is a fuel tank 11 which is supported by the carriers 3. Near the front end of the main frame tube 2 there are two rigid supports 12 which are fastened on the sides of the tube 2 and slope upwardly and forwardly from the tube 2 at an angle of about 45°. The top ends of the supports 12 are fastened to the underside of a housing of a combined change speed and differential gear box 13, which, as shown in FIG. 1, is disposed mainly ahead of the front end of the tube 2. The horizontal underside of the housing 13 is approximately at the level of the top of the engine 10, which is situated, as shown in FIG. 1, behind the housing 13. The output shaft of the engine 10 projects from the rear of the engine and is coupled with the input shaft of a gear wheel transmission 14 accommodated in a rigid housing which slopes upwardly from the engine towards the plane 9. The housing is disposed approximately below the tube 8. The directional disposition of the housing of the gear wheel transmission 14 is connected to the fact that the engine is disposed to one side of the plane 9 and at the lowest possible level with respect to the frame 1 with regard to the position of the center of gravity of the tractor.

The output shaft of the engine 10 drives, through the gear wheel transmission 14, an output shaft 15 of the gear wheel transmission 14 which is located near the plane of symmetry 9 and projects both to the rear and to the front. The rearwardly projecting shaft part 15 constitutes a power take-off shaft and the forwardly projecting shaft part is journalled in a tube 16 extending below the housing of the change-speed gear box 13 to a position near the front of the gear box 13. The front end of the shaft part 15 projects from the front end of the tube 16 and also constitutes a power take-off shaft 17. These power take-off shafts can be driven at a speed proportional to the speed of the engine. The tube 16 is located below the gear box 13 and in front of the housing of the gear wheel transmission 14. The rear end of the tube 16 is rigidly secured to the front of the housing of the gear wheel transmission 14 and is supported by a support 18 on the underside of the gear box 13. The front of the U-shaped frame part 5 embraces the housing of the change speed gear box and the differential 13 and the tie tube 8 of the frame part 5 is situated, as shown in FIG. 1, a short distance behind the rear of the engine 10.

To one side of the housing of the gear box 13 is fastened a drive casing 19 having a rearwardly directed output shaft which drives a mechanism arranged in a downwardly extending gear box 20. An output shaft 21 of the gear box 20 can be driven at a speed proportional to the travel speed of the tractor. The rearwardly projecting output shaft 21 is disposed near the underside of the gear box 20 and constitutes a power take-off shaft, which is extended towards the front to form a front power take-off shaft 22. This forwardly projecting shaft part is journalled in a tube 23, which is supported by the gear box as well as by the support 18.

The tube 16 bears on the front and rear sides of the gear box 20 and the shaft 15 extends continuously through the box 20. The shaft 15 is provided with a gear wheel in the box 20 which provides an input to the gear box 13 by way of further gear wheels. These gear wheels are arranged independently of the gear wheels driven by the output shaft of the drive engine.

A plurality of resilient mountings 24 of synthetic resin or rubber are arranged one behind the other on the top of each of the two tubes 7 of the U-shaped frame part 5 for supporting the tractor cab 6. The tractor cab 6 accommodates a driver's seat and steering means for the steerable wheels which will be described more fully hereinafter, and also accommodates control members for controlling drive to the wheels and preferably also for connecting and disconnecting drive to the power take-off shafts 15, 17 and 21, 22 by means of clutches (not shown). As shown in FIG. 1, the cab 6 comprises sidewalls with panes terminating at lower edges which lie on a boundary line 25 which slopes upwardly towards the front so that the rear wall of the cab extends only for a short distance above the frame part 5, this enabling the driver to get a good view of the rear part of the tractor. The boundary line 25 terminates at the front a short distance above the top of the gear box 13 so that the driver also gets a good view through the front pane of the cab 6 of the front part of the tractor. As shown in FIG. 2, the front pane of the cab terminates approximately vertically above the front of the gear box 13. The lower boundary 25 of the panes in the sidewalls terminates at the rear in an upwardly inclined portion which meets an upwardly directed edge.

Figure 3:
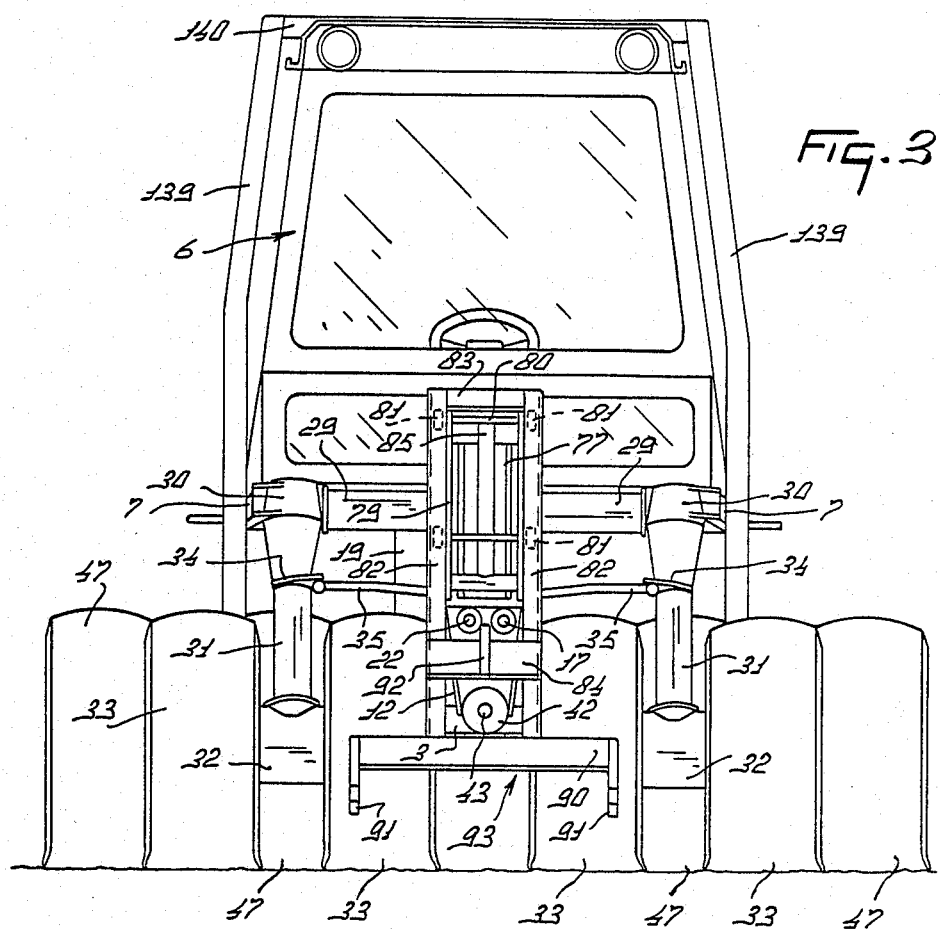
FIG. 3 is a front view of the tractor of FIGS. 1 and 2.

Tubular carriers 29 are secured to the sides of the housing of the gear box 13 at a position a short distance behind the front of this housing. These carriers 29 are disposed symmetrically about the plane 9. At their ends away from the housing of the gear box 13 the carriers 29 each terminate at the level of the front ends of the tubes 7 of the horizontal frame part 5. Near these ends, the carriers 29 are fastened to housings 30 of gear wheel transmission which will subsequently be described in detail. Tubular supports 31 are connected to the underside of the housings 30 and extend from the housings 30 downwardly and slightly to the front, their centerlines being inclined at an angle of about 80° to the horizontal. The tubular supports 31 are pivotable about their longitudinal center lines with respect to the housings 30 in a manner to be subsequently described more fully. At their lower ends the supports 31 are provided with wheel carriers 32, which are rigidly connected to their supports 31. The wheel carriers 32 are also tubular and extend horizontally and transversely of the direction A when in the position shown in FIG. 3, which corresponds to straight-ahead travel. Each wheel carrier 32, as can be seen in FIG. 3, is symmetrical about a vertical plane parallel to the plane 9. At least one front wheel 33 is mounted on each end of each wheel carrier 32 so that the tractor has, in all, at least four front wheels arranged in a row transverse to the direction A. The diameter of each front wheel is about 1.3 meters and the width of the pneumatic tire on each front wheel is about forty centimeters. The tops of the wheels 33 are approximately level with the top of the engine 10. The contact surface of all front wheels 33, as shown in the front view of FIG. 3, thus covers a width of at least 1.60 meters or, if more than four front wheels are provided, more than 1.60 meters.

The differential gear in the housing 13 has two output shafts which extend into the carriers 29 and drive bevel gear wheel transmissions in the housings 30 in a manner such that shafts located in the supports 31 drive bevel gear wheel transmissions arranged in the wheel carriers 32, the output shafts of which are coupled with the front wheels on each wheel carrier 32. The rotary axes of the front wheels 33 thus driven coincide with the centerlines of the wheel carriers 32. The supports 31 are journalled in the housings 30 so that the supports 31, with the associated wheel carriers 32 and the associated front wheels 33, are pivotable about the centerlines of the supports 31, these centerlines also coinciding with the centerlines of the drive shafts accommodated within the supports 31 for transmitting the drive to the front wheels 33. At their top ends the supports 31 are provided with levers 34, which are forwardly and inwardly inclined and are pivotally coupled at their ends away from the supports 31 with track rods 35, which extend inwardly from the levers 34 and are inclined to the rear. At their inner ends the track rods 35 are pivotally coupled with the rear corners of a triangular steering plate 36 (FIG. 2) which is pivotable about an upwardly directed pivotal shaft 37 with respect to the housing of the gear box 13 rigidly secured relatively to the frame 1. The pivotable shafts at both ends of the track rods 35 and the pivotable shaft 37 are preferably parallel to the centerlines of the supports 31 The rear end of the steering plate 36 is also pivotally connected to the end of the piston rod of a hydraulic ram 38, the cylinder of which is pivotable about an upwardly directed pivotal shaft with respect to the frame part 5 and one of the housings 30. The hydraulic ram 38 is situated a short distance behind one of the housings 30 and can be actuated from the cab 6. Viewed on plan (FIG. 2) the track rods 35 intersect a line perpendicular to the plane 9 and connecting the housings 30, the pivotable connections between the track rods and the steering plate 36 being located to the rear side of this connecting line. Apart from being steerable, the front wheels 33 are arranged on a carrying construction comprising the parts 29, 30, 31, 32, wherein the substantially vertical axis of housing 30 is fixed with respect to the tractor frame 1. The distance between the steering axes and the engine 10 is substantially equal to the diameter of each front wheel.

The front ends of the power take-off shafts 17 and 22 are positioned, as shown in FIG. 1, approximately in a plane containing the centerlines of the supports 31 and at the level of the tops of the front wheels 33. As seen from the front, the front end of the power take-off shafts 17 and 22 lie within the carrying construction comprising the parts 29, 30, 31, of the front wheels 33, this construction being generally in the form of an inverted U. Viewed from the side, the cab 36 extends forwardly approximately to a point above the rotary axes of the front wheels 33.

The rear end 39 of the main frame tube 2 is situated, as viewed from the side, approximately directly below the rear boundary of the cab 6. A length of cylindrical tube 40 is joined to the rear end 39 of the main tube 2. The front end of the length of tube 40, i.e. near the rear end 39, is closed by a strong partition which is locally welded to the inner periphery of the tube 40. To the front side of the partition is welded a cylindrical tube 41 which extends through the tube 2 up to its front end. The outer periphery of the tube 41 is a close fit in the inner periphery of the tube 2 so that the length of tube 40 and the tube 41, which are integral with one another, are rotatably journalled in the tube 2. The centerlines of the length of tube 40, the tube 41 and the tube 2 coincide with each other. A partition 42 is welded to the front of the tube 2 and has a central hole through which a bolt 43 extends. The part of the bolt 43 located inside the tube 2 is screwed into a tapped hole in a partition 44A which is located in the front end of the tube 41 and is welded at its periphery to the inner wall of the tube 41. The bolt 43 prevents the length of tube 40 from sliding rearwards in the pipe 2 and also permits adjustment of the contact pressure between the front end of the length of tube 40 and the rear end 39 of the tube 2.

To the rear end of the length of tube 40 is welded a beam 44, which may be tubular, which extends transversely of the direction A and, when the tractor is standing on a horizontal surface, is symmetrical about the plane 9. Each end of the beam 44 lies in a plane which is parallel to the plane 9 and approximately coincides with, or lies outside, the vertical plane of symmetry of the outermost front wheel on the same side of the plane 9. At these outer ends, the rear of the beam 44 is provided with carriers 45 which extend rearwardly and slope slightly downwards. The carriers 45 are releasably connected to the beam 44 by four bolts. Near the rear end of each carrier 45 is fastened a rotary shaft 46 which is parallel to the length of the beam 44 and projects to both sides of the respective carrier 45. At least one rear wheel 47 is rotatably mounted on each end of each of the rotary shafts 46, so that each carrier 45 has two rear wheels 47, disposed one on each side. The wheels 47 of each pair are mounted so that they are freely rotatable independently of each other.

Figure 4:
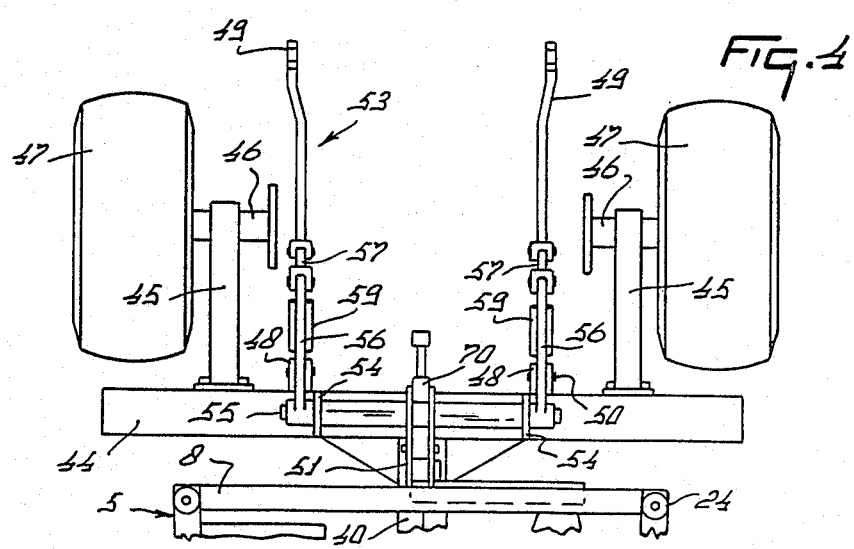
FIG. 4 is a fragmentary plan view showing an alternative construction for the rear part of the tractor.

In the modified configuration shown in FIG. 4, the carriers 45 may be fastened to the beam 44 at positions inwards from the ends of the beam 44. Each carrier 45 may then have a wheel 47 only on its outer shaft 46, that wheel then being positioned to run in the track of the outer front wheel on the same side of the tractor.

The four front wheels 33, like the four wheels 47, are arranged in a row transverse of the direction A, the disposition of the two rows being such that, as viewed parallel to the direction A, each of the outer front wheels 33 is located between the rear wheels 47 located on one side of the plane 9 so that, as seen in FIG. 2, the vertical plane of symmetry of each carrier 45 substantially coincides with the vertical plane of symmetry of an outermost front wheel 33. Each of the inner front wheels 33 is arranged so that, again viewed in the direction A, it is disposed substantially between the plane 9 and the inner rear wheel 47 on the same side of the plane 9. This is apparent from the front view of the tractor (FIG. 3), which shows that the wheels are in contact with the ground substantially over the entire width of the tractor so that the weight of the tractor is distributed over the entire width of the tracks. Measured transversely of the direction A, the overall dimension of the row of rear wheels 47 is about three meters. The diameter of all wheels is substantially the same and, as previously indicated, amounts to about 1.3 meters, the width of each wheel being about forty centimeters.

The rear wheels 47 together with the carriers 45, the beam 44 and the length of tube 40 with the tube 41 are pivotable about the centerline of the tube 2 with respect to the tractor frame and also with respect to the front wheels 33. Fastening lugs 48 are secured rigidly to the rear of the beam 44, on both sides of the plane 9, for the pivotal connection of lower lifting arms 49, which extend rearwardly away from the lugs 48 and slightly diverge from each other to the rear, remaining symmetrical about the plane 9. The lifting arms 49 are pivotable with respect to the lugs 48 about pivotal shafts 50 extending parallel to the beam 44. Viewed from the side, these pivotal shafts 50 are located near the fronts of the wheels 47.

Figure 7:
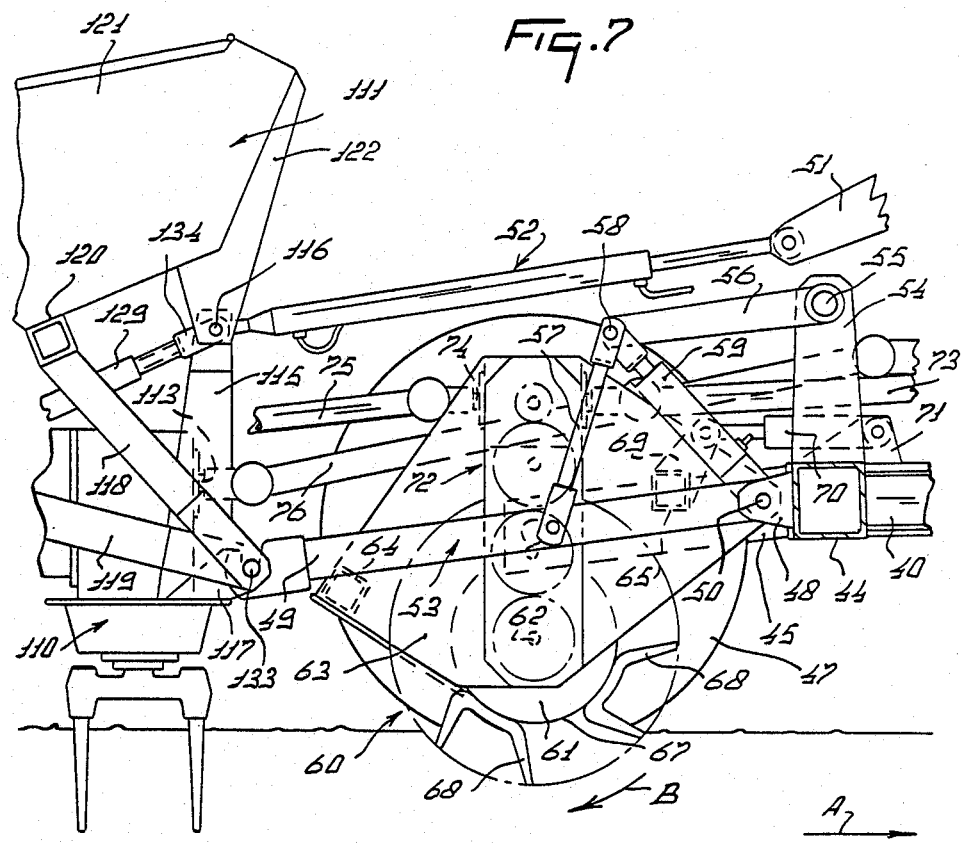
FIG. 7 is an enlarged view of the rear part of the tractor and the adjacent parts of the attached implements.

Near the plane 9, two rearwardly directed arms 51 are rigidly secured to the frame part 5. These arms 51 are close to the plane 9 on both sides, and the rear ends of the arms are adapted to pivotally receive a top rod 52, which together with the lower lifting arms 49 constitutes a three-point lifting device 53 (FIG. 7). The top rod 52 comprises a hydraulic ram which is actuable from the cab 6 to change its length.

Two upwardly directed supports 54 (FIGS. 1 and 7) are fastened to the top of the beam 44 at a distance from one another and on both sides of the plane 9. A shaft 55 is journalled in the top end of the supports and extends parallel to the beam 44. Each end of the shaft 55 is rigidly or pivotally connected to a carrier 56, which extends to the rear away from the shaft 55 and is about 40% as long as the lower lifting arms 49. The rear end of each carrier 56 is pivotally connected by a downwardly directed lifting arm 57 with a respective one of the lower lifting arms 49 at approximately its mid-point. A pivotal shaft 58 connects each carrier 56 and the associated lifting arm 57, and about this shaft 58 is pivotable the end of the piston rod of a hydraulic ram 59, which is actuable from the cab 6 and which is connected to the beam 44 so as to be pivotable about the respective pivotal shaft 50. By energizing the two rams 59 the lower lifting arms 49 can be forcefully urged upwardly or downwardly.

Between the inner rear wheels 47 there is arranged a propulsion device 60, made entirely of metal, which is part of the tractor. The device 60 comprises a drivable roller or cultivator 61 and can be driven in the same sense of rotation (arrow B in FIGS. 1, 7) as the drivable front wheels 33. The roller or cultivator 61 can be driven about the axis of a substantially horizontal rotary shaft 62 which extends transversely of the direction A and is journalled near its ends in vertical plates 63. The plates 63 are rigidly interconnected by beams 64 and 65, which are parallel to each other and normal to the plane 9. The beams 64 and 65 are disposed respectively behind and in front of the top of the roller or cultivator 61 (FIG. 7). The assembly 63 to 65 together with the roller or cultivator 61 is pivotable as a whole about aligned pivotal shafts 66 (FIG. 2), the axes of which coincide with those of the pivotal shafts 50. The assembly 63 to 65 and the roller or cultivator 61 are situated, as viewed on plan, between the lower lifting arms 49.

The roller or cultivator comprises a metal cylinder 67 which can rotate about the axis of the rotary shaft 62. Outwardly projecting tines 68 are secured to the cylinder 67. There are five sets of tines disposed side by side along the length of the shaft 62. In each set of tines, the rigid tines are grouped in pairs, each pair being made from a single piece of metal. The tines are directed outwardly from the cylinder 67 and are raked to the rear with respect to the direction of rotation B.

Near the middle of the front beam 65 there ar lugs 69 which establish a pivotal connection between the beam 65 and the rear end of the piston rod of a hydraulic ram 70. The ram itself is fastened to a pivotal shaft journalled between lugs 71 which are rigidly secured to the top of the beam 44 and the length of tube 40. By actuating the ram 70 from the cab 6, the propulsion device 60 can be pressed into the soil or moved upwards.

A gear wheel transmission 72 is secured to one of the side plates 63, and has near its top a forwardly projecting input shaft which can be coupled, by an auxiliary shaft 73 including universal joints, to the rear power take-off shaft 21, which can be driven at a speed proportional to the travelling speed of the tractor. The gear wheel transmission 72 is such that the peripheral speed of the tines 68 is substantially the same as, or slightly greater than, that of the ground wheels 33, 47, so that the tines 68 penetrating into the soil contribute to the propulsion of the tractor. An output shaft 74 is integral with and aligned with the input shaft of the gear wheel transmission 72, and can be coupled by an auxiliary shaft 75 including universal joints with implements or other equipment attached to the lifting device 53 (FIG. 7).

The power take-off shaft 15, which can be driven at a speed proportional to that of the engine 10, can be coupled by an auxiliary shaft 76 having universal joints (FIG. 7) with equipment attached to the three-point lifting device.

At the front of the tractor, two supporting plates 77 are fastened to the housing of the gear box and the differential 13. These plates 77 are disposed one on each side of the plane 9 and project forwardly. A pivotal shaft 78, journalled in the top front region of the supporting plates 77 at about the level of the top of the gear box 13, pivotally supports two fastening plates 79 extending downwardly approximately to the level of the underside of the gear box 33. At the front, the fastening plates 79 support two shafts 80 disposed at right angles to the plane 9 (FIG. 3) and one below the other. Four rollers 81 are rotatably mounted on the ends of the two shafts 80. These rollers 81 are situated in two adjacent, upwardly directed channel-section beams 82 disposed one on each side of the plane 9 to that the beams 82 can slide up and down on the rollers 81 with respect to the rest of the tractor. The channel-section beams 82 have their open sides facing each other.

At their top ends, the beams 82 are rigidly interconnected by a beam 83 which is at right angles to the plane 9, and at a lower place by a beam 84. In the position shown in FIG. 1, about half of the length of each beam 82 projects below the underside of the gear box 13.

An upwardly directed hydraulic ram 85 is disposed between the fastening plates 79 and is supported at its lower end by a pivotal shaft 86 carried by the plates 79. The ram 85 is pivotally connected near its top end to a support fastened to the beam 83.

Between the supporting plates 77 there is a substantially horizontal hydraulic ram 87, which is pivotally mounted at its rear end on a pivotal shaft 88. At the front, it is pivotally mounted by a pivotal shaft 89 on the fastening plates 79. The pivotal shafts 78, 86, 88, 89 are normal to the plane 9.

A horizontal transverse beam 90 is fastened to the lower ends of the beams 82, and projects beyond the beams 82 to a position on each side near the outer side of the respective inner front wheel 33.

The two ends of the beam 90 are provided with downwardly directed coupling points 91 with quick-action couplings so that the driver can connect a tool to the couplings from the cab 6. In the middle, the beam 84 has a coupling point 92 located at the plane 9 to form with the coupling points 91 a three-point lifting device 93. The coupling point 92 also has a quick-action coupling.

By actuating the hydraulic ram 87 the driver in the cab 6 can vary the angle of the beams 82 with respect to the ground in the fore-and-aft direction, and by actuating the hydraulic ram 85 the whole lifting device can be displaced upwardly and downwardly, so that any desired position of the lifting device 93 can be obtained by the driver without needing to leave the cab for example to adjust the length of a loosely pivotable top rod and to couple the top rod. In principle, the lifting device 93 may also be arranged on the rear of the tractor.

The lifting device 93 is positioned a short distance ahead of the front wheels 33 and projects forward a very small amount measured in the direction A. The topmost coupling point 92 is located approximately at the same level of the tops of the front wheels 33 in the operative position shown in the Figures.

Figure 5:
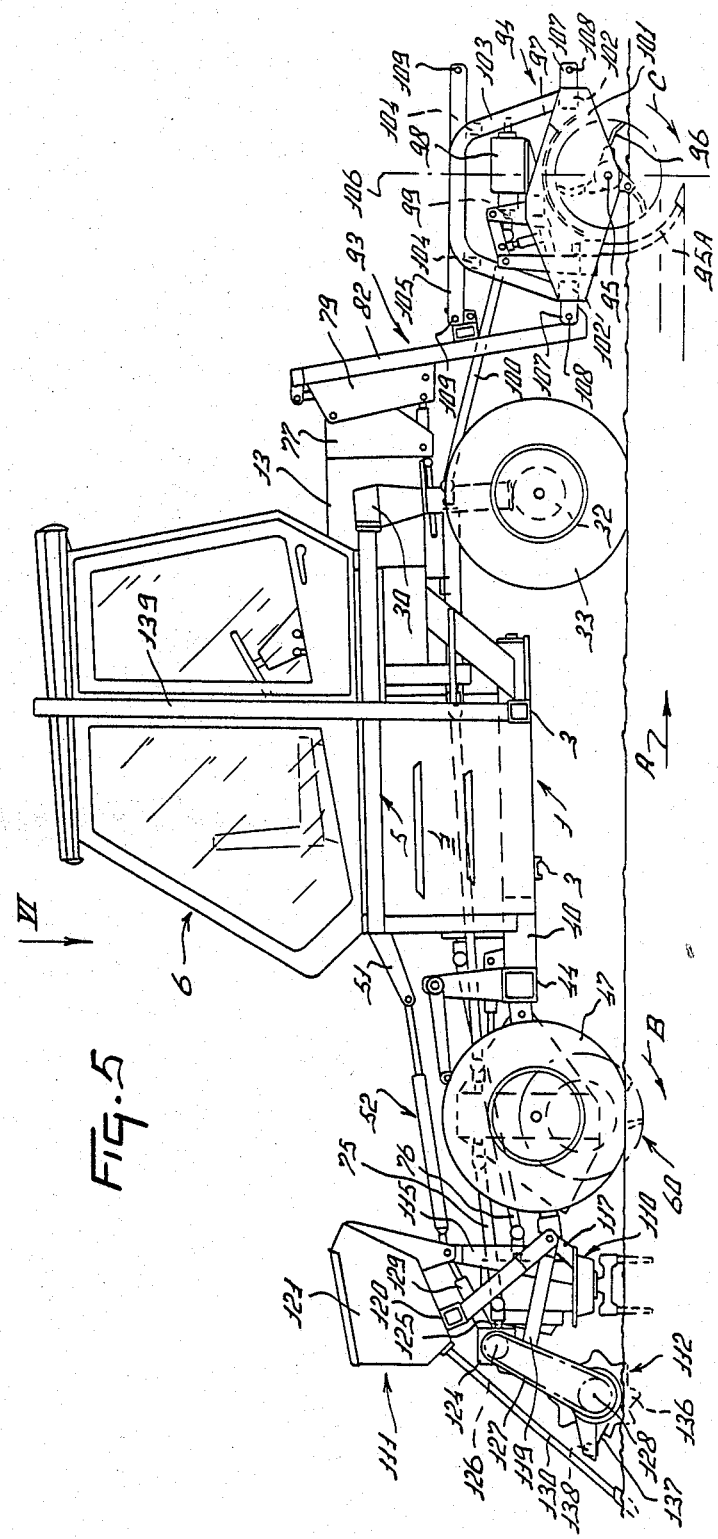
FIG. 5 is a side view of the tractor of FIGS. 1 to 3 with implements fastened at front and rear.
Figure 6:
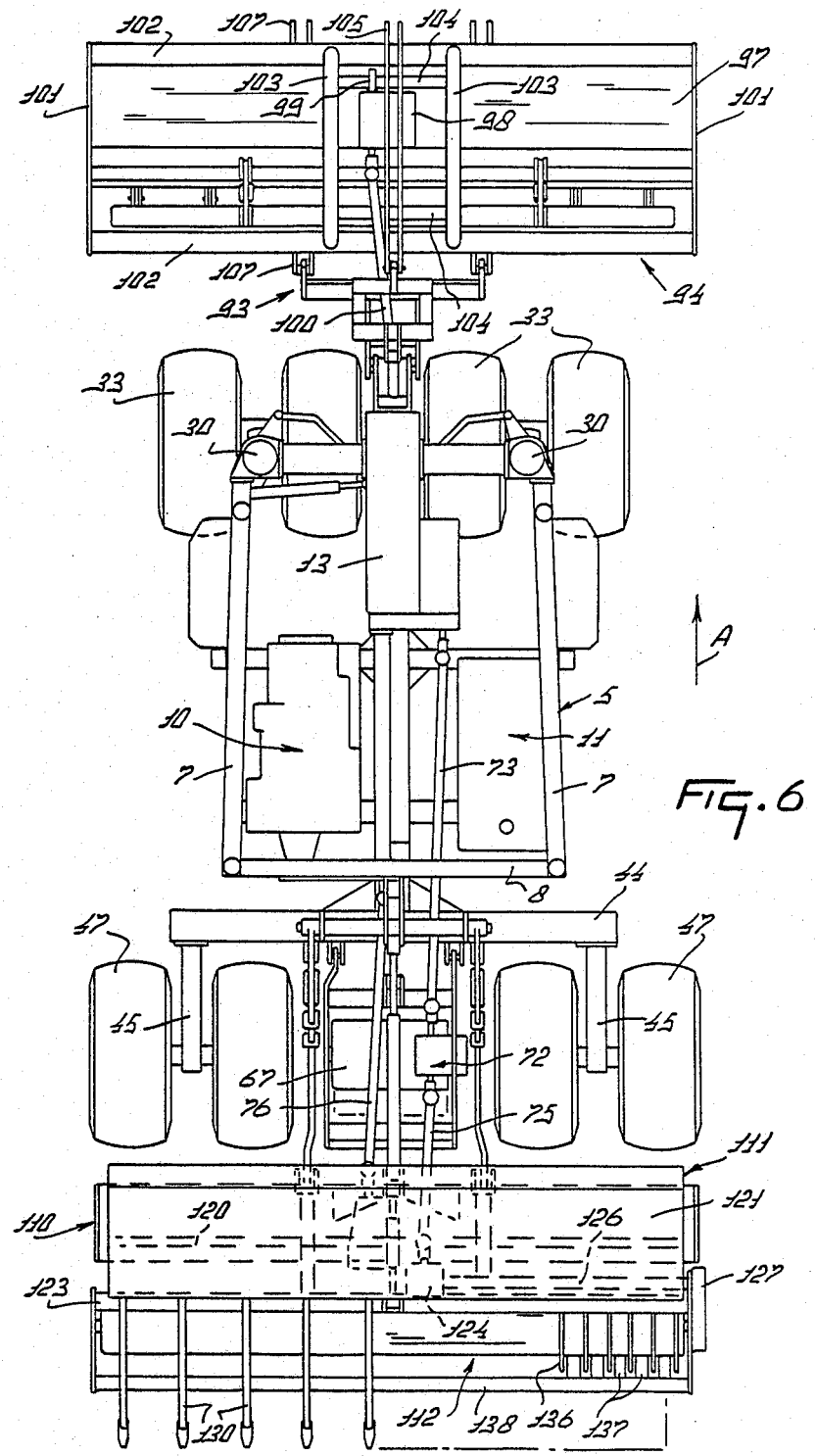
FIG. 6 is a plan view of the tractor and implements shown in FIG. 5.

FIGS. 5 and 6 show one or more machines or implements attached both to the front lifting device 93 and to the rear lifting device 53. The assembly of FIGS. 5 and 6 constitutes agricultual machinery, the tractor forming the prime mover.

In the agricultural machinery shown in FIGS. 5 and 6, the front lifting device 93 is connected to a soil cultivator 94 comprising a horizontal shaft 95, extending transversely of the direction A, to which is fastened throughout its length (which is about three meters in this embodiment) cultivator bodies 96. This operative part of the soil cultivator 94 is covered over its entire effective length by an arcuate cover plate 97. The shaft 95 can be driven through a gear box 98 disposed centrally of the cultivator. An input shaft 99 of the gear box 98 can be connected by an auxiliary shaft 100 including universal joints with the front end of the power take-off shaft 17 or 22 of the tractor. As mentioned above, the power take-off shafts 17 and 22 can be driven, respectively, at a rotary speed proportional to the rotary speed of the output shaft of the engine 10 of the tractor or at a rotary speed proportional to the travel speed. The cultivator 94 can be driven in the direction C and so can contribute to the forward drive of the machinery.

The shaft 95 of the soil cultivator 94 is supported by side plates 101. The two side plates 101 are supported at the front and rear by beams 102. The two beams 102 are at right angles to the plane 9, and are interconnected by two relatively spaced, curved tubes 103 which are disposed side by side symmetrically with respect to the gear box 98 and to the plane 9. The two tubes 103 are interconnected near their tops by tie beams 104 which are parallel to the shaft 95. Near the plane 9 there are two parallel, vertical supporting plates 105 which extend in the direction A and are rigidly secured to the tie beams 104. As shown in FIG. 5, the tubes 103, the tie beams 104 and the supporting plates 105 are symmetrical about a vertical plane 106 which goes through the shaft 95 and is at right angles to the plane 9. On the rear side of the rear beam 102 and also on the front side of the front beam 102 there are supporting plates 107 which are rigidly secured to the respective beam 102. The supporting plates 107 have fastening holes 108 for attaching the soil cultivator 94 to the lifting device of a prime mover. Near the two ends of the supporting plates 105 there are fastening holes 109 for attachigg the cultivator to the top point of a three-point lifting device. The distance between the supporting plates 107 corresponds to that between the lower coupling points 9 of the lifting device 93. As shown in FIG. 5, the three coupling points 108, 109 on one side of the cultivator 94 and those on the other are disposed symmetrically about the plane 9 so that the cultivator 94 can be attached to a three-point lifting device either at its front or rear. Obviously it is possible in an analogous manner to construct other types of agricultural machines or implements with such dual coupling capability. In the embodiment shown in FIG. 5, the fastening holes 109 are disposed, as viewed from the side, directly above the respective fastening holes 108, but this is not essential.

A row of soil working members 95A is disposed behind the cultivator drivable about the shaft 95. The row of members 95A extends over the whole width (three meters) of the soil cultivator and is movable up and down parallel to itself from the cab by means of one or more hydraulic rams.

FIGS. 5 and 6 show three machines attached to the lifting device 53 at the rear of the tractor, these being a rotary harrow 110 having soil working members which are drivable about upwardly directed axes, a seed drill 111 disposed above the harrow 110, and a drivable roller 112 arranged behind the harrow 110 and partly below the seed drill 111 and serving inter alia as a crumbling roller for breaking up lumps of earth.

The harrow 110 has an input shaft 113 (FIG. 7) lying close to the plane 9 and coupled by the auxiliary shaft 76 including universal joints with the power take-off shaft 17, The harrow 110 is provided midway along its length with an upwardly directed, substantially triangular trestle 115, which, near its top end, has fastening holes 116 for attachment of a top rod 52 of the lifting device 53. Near the two sides of the trestle 115 the main frame of the harrow is provided with supports 117 for coupling the harrow 110 with the lower lifting arms 49 of the tractor. Two further supporting beams 118 and 119 cooperate with each of the supports 117. The supporting beams 118 support the seed drill 111 and the supporting beams 119 support the drivable roller 112. The two supporting beams 118 located one on each side of the plane 9 are upwardly and rearwardly inclined from their lower coupling points and extend up to a carrying beam 120 supporting a seed hopper 121 which extends over the length of the seed drill 111 (about three meters). The supporting beams 118 are preferably rigidly secured to the rest of the seed drill 111. The dimensions are such that the two supporting beams 118 extend above the harrow 110. At the front and near the plane 9, the seed hopper 121 is provided with a support 122 by which the seed drill 111 can be coupled both with the top end of the trestle 115 and the top rod 52.

The supporting beams 119 associated with the drivable roller 112 and arranged symmetrically about the plane 9 extend rearwardly and are slightly upwardly inclined from their connection with the lower lifting arms 49. The extend up to a carrying beam 123 comprising a frame beam for the roller 112. The supporting beams 113 are preferably rigidly secured to the frame of the drivable roller 112. On one side of the plane 9 and at a short distance from it, there is a gear box 124 of the roller 112 which is supported by the carrying beam 123 of the frame of the roller 112. The gear box 124 comprises a speed reduction mechanism through which the roller 112 can be driven. An input shaft 125 of the gear box 124 is drivably connected by the auxiliary shaft 75 provided with universal joints to the output shaft 74 of the gear wheel transmission 72 of the propulsion device 60, the shaft 74 being drivable at a rotary speed proportional to the travel speed of the tractor. The gear box 124 has an output shaft which is connected by a drive shaft 126 at right angles to the plane 9 with an input shaft of a drive casing 127, which extends downwardly and to the rear from the shaft 126 towards a main shaft 128 of the drivable roller 112. The drive casing 127 contains a chain drive through which the roller 112 can be driven with a peripheral speed approximately equal to or slightly higher than the travelling speed of the tractor. The speed of the output shaft of the change-speed gear box 13 is reduced for this purpose in the drive casing 19 of the tractor, in the speed reduction mechanism 124 and in the drive casing 127.

Near the plane 9, the frame of the drivable roller 112 has pivoted to it a rod 129 of adjustable length, which extends from the top of the harrow 110 and the underside of the seed drill 111 up to the upper coupling point of the trestle 115 and of the seed drill 111 for fastening to the top rod 52 of the lifting device 53. The seed drill 111 is provided with a row of seed tubes 130, which slope downwardly and rearwardly from the seed hopper 121 and enter the soil behind the drivable roller 112.

Figure 8:
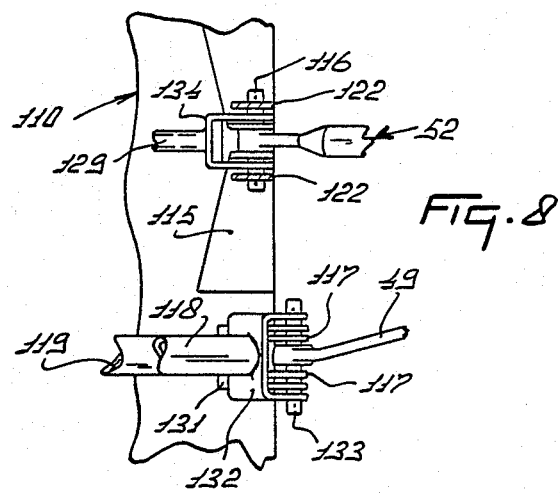
FIG. 8 is an enlarged fragmentary plan view of a coupling construction between a lifting device of the tractor and implements attached to it.

From the above description it will be clear that the fastening points of three machines to the top rod 52 and to the lower lifting arms 49 of the three-point lifting device 53 substantially coincide. For this purpose the fastening points are designed as is shown in FIG. 8 on an enlarged scale. In this way, the attachment of one or more machines does not require coupling points of another machine fastened to the same lifting device, which would consequently have to be more complicated and heavier. In FIG. 8 the pair of supports 117 of the harrow 110 located on one side of the plane 9 is also designated by reference number 117 . These supports 117 are surrounded by a fork 131 fastened to the supporting beam 119 of the drivable roller 112. The fork 131 is surrounded in turn by a fork 132 fattened to the end of the supporting beam 118 of the seed drill 111. This is possible because the supports 117 , the supporting beam 119 and the supporting beam 118 are always inclined to each other, as will be apparent from FIG. 5. The supports 117 and the forks 131 and 132 are connected by a pin 133 to the rear end of the associated lower lifting arm 49. At the top, the trestle 115 provides supports designated in FIG. also by reference numeral 115. Outside supports 115 there is a fork 134 fastened to the rod 129 which connects the roller 112 to the top rod 52. Outside the fork 134 there are the two supporting plates 122 (FIG. 7) which connect the seed hopper 121 to the top rod 52 of the lifting device 53. If the seed drill 111 and the drivable roller 112 were provided with supports 118 and 119 respectively pivotally fastened to the associated machine, the multiple coupling proposed would also be possible, since, as viewed from the side, triangular linkages are created, which may be considered to resist deformation.

FIG. 9 shows a further potential agricultural machinery combination on the basis of the same prime mover. In FIG. 9, a fertilizer dispenser 135 is fastened to the lifting device 53. This dispenser may alternatively be arranged in place of the drivable roller 112 in combination with the harrow 110 and the seed drill 111, provided that the dispenser 135 is provided with coupling supports 119.

In this way the following combinations may be made:
1. Power unit with seed drill.
2. Power unit with roller and seed drill.
3. Power unit with rotary harrow and roller.
4. Power unit with rotary harrow and seed drill.
5. Power unit with rotary harrow, roller and seed drill.
6. Power unit with cultivator, roller and seed drill.
7. Power unit with cultivator, rotary harrow and fertilizer dispenser.
8. Power unit with cultivator, rotary harrow, roller and seed drill.
9. Power unit with cultivator at the front of the power unit.
10. Power unit with cultivator at the rear of the power unit.
11. All combinations of cultivator at the front or at the rear with other implements.

The overall length of the agricultural machinery is about 6.4 times the diameter of the wheels of the tractor. The overall width of the machinery is about 2.3 times the diameter of the wheels of the tractor. The distance between the two rows of wheels 33 and 47, measured at the rotary axes, is about equal to the length of the longer row of wheels.

During operation the engine 10 drives the change-speed and differential gear box 13 through the gear wheel transmissionly, from where the front wheels 33 are driven with a transmission ratio as desired by the driver, determining the travelling speed. The power take-off shafts 15 and 17, which project respectively to the rear and to the front, are directly driven by the engine output shaft during operation. The foremost and rear power take-off shafts 22 and 21 are driven from the output of the gear box at a speed, as stated above, proportional to the travelling speed. Power take-off shafts are thus present both at the front and at the rear of the tractor which can be driven at a speed proportional to the speed of the engine and to the travelling speed. The cultivator 94 can be driven by means of the auxiliary shaft 100 optionally from the power take-off shaft 17 (proportional to the speed of the engine) or from the power take-off shaft 22 (proportional to the travelling speed).

By actuating the hydraulic ram 38 (FIG. 2) the front wheels can be steered about the centerlines of the tubular supports 31, which operate as king pins. The maximum angle of turn of the front wheels from the position shown in FIG. 2 (corresponding to straight-ahead travel) is about 90° to each side, so that a total lock-to-lock turn of the front wheels about the king pins of about 180° is obtainable. The geometry of the wheel control by means of the steering plate 36 and the steering rods 35 and the levers 34 is such that the center of rotation of the tractor when turning at full lock is located inside the outer boundary of the tractor, as viewed on plan. This is an advantage when maneuvering at the head land of a field, since the very small turning circle means that the area of useful, cultivated land can be maximized.

By actuating the hydraulic ram 87 the position of the front three-point lifting device 93 can be adjusted with respect to the ground by turning it about the pivotal shaft 78. This facilitates the coupling of machines or implements, since it is not necessary to adjust coupling points such as the top rods. The whole lifting device 93 can be displaced up and down by means of the ram 85 which causes the beams 82, 83, 84, 90 and the coupling points 91, 92 to be displaced upwardly and downwardly on the rollers 81. The rams 85 and 87 can be actuated from the driver's cab.

By actuating the hydraulic rams 59, the levers 56 are turned about the shaft 55 so that by means of the lever arms 57 the lower lifting arms 49 of the lifting device 53 can be moved vigorously upwardly and downwardly from the cab 6.

Drive to the implements attached to the lifting device 53 is transmitted by the auxiliary shaft 75 (proportional to the travelling speed) or optionally by the auxiliary shaft 76 (proportional to the speed of the engine) as stated earlier with reference to the implements fastened to the lifting device 53. The seed drill 111 can be driven through a belt or chain transmission (not shown) from the input shaft 125 of the roller 112 or directly from the auxiliary shaft 75. The main shaft 128 of the roller 112 can be driven at a speed substantially corresponding to, or slightly greater than the travel speed of the tractor. The main shaft 123 is tubular and is provided with a row of cutting blades having transverse extensions 136, this row extending over their entire width (about three meters) of the machine. The effective width of the seed drill 111 and that of the rotary harrow 110 also correspond to that dimension. Driving the extensions 136 from the power take-off shafts produces a soil cultivation in addition to the preceding cultivation and also creates a tractive force for the machinery as a whole in addition to the tractive force exerted by the drivable wheels so that the tractive force exerted by the wheels 33 and hence the ground pressure may be lower than it would have to be if the drivable roller were not present. Under bad soil conditions the roller 112 can contribute significantly to the advancement of the machinery because it is driven with a small amount of slip compared with that of wheels driven through differential gearing. For this purpose the radial dimensions of the extensions 136 may be comparatively large. During operation the tubular shaft 128 carrying the extensions can bear on the ground and be kept clean by scrapers 137, which are fastened to a frame beam 138 disposed behind the rotatable roller and extending along the entire width of the roller. The scrapers 137 extend from the beam 138 forwardly and downwardly between the axially directed extensions to bear on the periphery of the tubular shaft. The height of the cutting edges above the pipe is approximately equal to the distance between the cutting edges.

The machines are coupled to the rear lifting device 53 in a way which enables these machines together with the lifting device 53, the rear wheels 47, the carriers 45 and the beam 44 to pivot as a whole about a horizontal axis extending in the direction A (the centerline of the tube 2) with respect to the rest of the tractor and also with respect to any machine fastened to the front lifting device 93. It is, of course, also possible to fasten more machines to the lifting device 93 in the same manner as is described with reference to the rear lifting device 53. The tractor shown in FIGS. 1 to 3 may have a relatively low weight by using wheels of relatively small diameter (at the most one meter) having rims of aluminium of other lightweight metal, since the wheel weight increases or decreases mainly with the square of the wheel diameter. The frame of the machine has a very low weight since it comprises mainly the tube 2 with supports 3 for the engine and the fuel tank and supports 12 for the gear box 13 and a lightweight frame part 5 for the cab 6. The cab 6 comprises walls and a roof made from synthetic resin. With this construction it is possible for the weight of the tractor or power unit to be about 3500 kilograms. The power of the engine 10 will be about 100 kilowatts.

The pneumatic tires of the wheels 33 and 47 are low-pressure tires having low profiles of a height of about five centimeters. When using low-pressure tires the contact surface of each tire with the ground is appreciably wider than the nominal width of the tire so that a large ground contact surface is obtained.

Since the tractor or power unit is provided with eight wheels, the tracks of which either do not overlap at all or overlap only slightly, a large contact area for the weight of the tractor on the ground is obtained. This, combined with the low weight of the tractor, means that the ground pressure is very low. In this way the soil structure below the tractor remains intact without adverse effect on the subsequent growth of crops. In the alternative configuration of the rear wheels 47, the tractor may be used for row cultivation, apart from the configuration of FIG. 2.

The distribution of the tractor weight is such that most of the weight is carried on the drivable front wheels 33. The weight of the engine and of the fuel tank is applied midway between the two rows of wheels 33 and 47, whereas the weight of the change-speed and differential gear box as well as the major part of the weight of the cab is carried by the front wheels in order to obtain a high tractive force. Moreover, the front lifting device 93 and the machines attached to it are disposed near the front wheels 33.

The fact that the row of rear wheels 47 and the machines attached to the rear lifting device 53 are freely pivotable with respect to the rest of the tractor about the axis of the tube 2 means that the drivable wheels 33 remain permanently in contact with the ground.

The disposition of the propulsion device 60, which is driven at a peripheral speed corresponding to, or slightly higher than, the travel speed, provides the possibility of using some of the power delivered to the power take-off shaft for propulsion purposes, in addition to the propulsion force appliedby the drivable roller 112 and the soil cultivator 94, so that the propulsion is not inhibited by slip of the driven wheels. Under some conditions the propulsion device 60 is capable of providing half or more of the required traction force. Owing to its construction and to its central position the device 60 has the 15 additional advantage that it does not require a differential and it may be rendered operative or inoperative at will with the aid of the lifting means 69, 70. The propulsion device 60 may be arranged in a similar manner between the inner front wheels 33.

The light-weight cab wall, for example of synthetic, resin, contributes to the low weight of the tractor. the front carrier 3 is provided at both ends wit upwardly directed beams 139, which are interconnected above the cab roof by a transverse beam 140. The cab is located inside the beams 139, 140, which constitute a safety framework.

FIGS. 10 and 11 show a very light, alternative safety framework 141 for the driver comprising a beam which is bent to provide beam portions 142 extending upwards from the two ends of the rear carrier 3 and which at the level of the frame part 5 meet beam portions 143 which slope slightly to the front. The beam portions 143, at positions above the driver's seat, meet horizontal portions 144 extending forwardly up to a position substantially directly above the rotary axes of the front wheels. The beam portions 143 are rigidly interconnected by a transverse beam portion 145, and near its front end the safety framework is bounded by transverse beam portions 146 which is integral with the portions 142, 143, 144. As viewed on plan, the beam portions 143 and 144 converge slightly towards the front. In this embodiment the driver's seat is not surrounded by walls.

The tractor described above is a power unit for driving agricultural machinery which may be a combination of several implements of various kinds. The tractor is a power unit particularly suitable for soil cultivation. The combination of power unit and implements is in particular suitable for soil cultivation in spring and sowing autumn-plowed land (owing to the low ground pressure) as well as to working stubble fields and soil cultivation in autumn and sowing.

Owing to tee low tractor weight, significant fuel economy is obtained, particularly when the tractor travels on plowed soil.

The soil is less compressed and hence the yield of crop is enhanced. With the many wheels of the tractor forming a substantially continuous row, viewed from the front, loose earth is uniformly and slightly consolidated, while wheel tracks are avoided.

This results in a tractor of relatively low weight and hence a low cost price, while the crop yield is increased and less fuel is consumed. The tractors disclosed herein represent reversals of the tendency towards increase of weight of conventional tractors, and combine propulsion and soil cultivation while maintaining the soil structure and saving energy.

Although various features of the tractor and machinery described and illustrated in the drawings, will be set forth in the following claims as inventive features, it should be understood that the invention is not necessarily limited to these features and may encompass all disclosed novel features considered both individually and in various combinations.

Having thus disclosed my invention what I claim as new and to be secured by Letters Patent of the United States is:

1. An agricultural tractor for seedbed preparation which comprises an engine having a power rating between sixty and one hundred kilowatts; a lightweight frame which supports said engine, the tractor's drive train and an operator cab, the tractor's structural components including said frame having a weight which is between twenty-five hundred and four thousand kilograms arranged so that the tractor has a power-to-weight ratio which is 0.02 kilowatts per kilogram or higher; a plurality of front and rear wheels for supporting said frame, each of said wheels having low pressure tires thereon each of the same size and having ground contacting surfaces which are at least forty centimeters in width, said front and rear wheels being aligned such that in a front elevational view said front tires are offset to one side of said rear tires wherein the tracks of said front and rear wheels form a wheel path which is substantially continuous in width with the major thickness of each said tire being visible from the front so that the underlying soil is compacted to a relatively minor degree over a relatively extended total width of all said heels; and at least one power take-off shaft to which power driven agricultural machines are connectable.

2. A tractor as claimed in claim 1, wherein said frame is of tubular construction and said cab of the tractor is constructed of relatively lightweight materials.

3. A tractor as claimed in claim 1 in which the tractor comprises rotary soil working means mounted at its front and which in operation exercises a pulling force on the tractor.

4. A tractor as claimed in claim 2, in which the rotary means consist of a rotary tiller with tines.

5. A tractor as claimed in claim 1, in which the weight of the tractor is about thirty-five hundred kilograms.

6. A tractor as claimed in claim 5, in which the diameter of said wheels is about 1.3 meters.

7. A tractor as claimed in claim 1 comprised of at least two lifting devices, one at the front and the other at the rear of the tractor.

8. A tractor as claimed in claim 7 comprising at one end of the tractor one power take-off shaft and at the other end another power take-off shaft, both said power take-off shafts being drivable at a speed proportional to the speed of said engine and at least one further power take-off shaft which is drivable at speed proportional to the tractor's travel speed.

9. A tractor as claimed in claim 1 comprising a supporting beam directed transverse to the direction of travel, wheel carriers supported by said supporting beam near opposite ends thereof, said wheel carriers extending at substantially a right angle with said supporting beam, a pair of wheel shafts each secured to one end of a respective one of said wheel carriers perpendicular thereto with said rear wheels each secured to one of said wheel shafts, in which each said wheel carrier is capable of being mounted at either of two places on said supporting beam whereby the overall tractor width may be adjusted.

10. A tractor as claimed in claim 9, in which one of said wheels can be removably mounted on each said wheel carrier by means of readily accessible bolts based upon the location of said wheel carrier on said support beam.

11. An agricultural tractor as claimed in claim 1 further comprising: a propulsion device, which comprises a drivable agricultural implement located between the tractor's rear wheels and driven in the same direction of rotation and at a circumferential speed of rotation substantially the same or slightly greater than that of the tractor's front wheels, said front wheels being drivable, said propulsion device capable of engagement of disengagement with the ground.

* * * * *